(12) United States Patent
Avallin

(10) Patent No.: US 10,940,402 B2
(45) Date of Patent: Mar. 9, 2021

(54) METHOD AND SYSTEM FOR TRANSFERRING SEPARATION RESIN

(71) Applicant: CYTIVA SWEDEN AB, Uppsala (SE)

(72) Inventor: Johan Fredrik Avallin, Uppsala (SE)

(73) Assignee: CYTIVA SWEDEN AB, Uppsala (SE)

( * ) Notice: Subject to any disclaimer, the term of this patent is extended or adjusted under 35 U.S.C. 154(b) by 28 days.

(21) Appl. No.: 16/338,117

(22) PCT Filed: Sep. 29, 2017

(86) PCT No.: PCT/EP2017/074902
§ 371 (c)(1),
(2) Date: Mar. 29, 2019

(87) PCT Pub. No.: WO2018/060496
PCT Pub. Date: Apr. 5, 2018

(65) Prior Publication Data
US 2020/0023290 A1    Jan. 23, 2020

(30) Foreign Application Priority Data
Sep. 30, 2016 (GB) .................................. 1616702
Jan. 31, 2017 (GB) .................................. 1701576

(51) Int. Cl.
*B01D 15/20* (2006.01)
*G01N 30/56* (2006.01)
(52) U.S. Cl.
CPC .......... *B01D 15/206* (2013.01); *G01N 30/56* (2013.01); *G01N 2030/565* (2013.01)
(58) Field of Classification Search
CPC . B01D 15/206; G01N 30/56; G01N 2030/565
(Continued)

(56) References Cited

U.S. PATENT DOCUMENTS 626,950 A * 6/1899 Wheelwright .......... B01F 5/242
366/134
2,006,393 A * 7/1935 Hapgood .................. B67C 3/30
141/57
(Continued)

FOREIGN PATENT DOCUMENTS

CN 202155132 U 3/2012
EP 1060754 A1 * 12/2000 .......... A61M 5/1408
(Continued)

OTHER PUBLICATIONS

Great Britain Search Report corresponding to Great Britain Application No. 1616702.5, dated Mar. 13, 2017.
(Continued)

*Primary Examiner* — Timothy L Maust
*Assistant Examiner* — James R Hakomaki
(74) *Attorney, Agent, or Firm* — Jeff B. Vockrodt; Culhane Meadow, PLLC

(57) ABSTRACT

A method and a system for transferring a slurry of a separation resin, from at least one first container to a second container, said method comprising the steps of:
connecting the at least one first container to the second container by a transferring connection;
providing a degree of vacuum to the second container by a vacuum production device connected to the second container;
allowing the vacuum in the second container to affect the content in the at least one first container through the transferring connection such that the slurry initially provided in the at least one first container is transferred to the second container through the transferring connection.

15 Claims, 6 Drawing Sheets

(58) Field of Classification Search
USPC .................................................. 141/10
See application file for complete search history.

(56) References Cited

U.S. PATENT DOCUMENTS

| | | | | |
|---|---|---|---|---|
| 2,075,678 A * | 3/1937 | von Langen | ............... | F17C 7/02 62/50.1 |
| 2,982,247 A * | 5/1961 | Varese | ....................... | A01J 5/04 119/14.11 |
| 2,999,500 A * | 9/1961 | Schurer | .................. | B65D 77/06 604/322 |
| 3,078,847 A * | 2/1963 | Wandell | ............... | A61M 1/0209 422/41 |
| 3,098,819 A * | 7/1963 | Sager | ..................... | B01D 35/00 210/97 |
| 3,675,670 A * | 7/1972 | Ogawa | ..................... | B67D 7/78 137/1 |
| 3,863,664 A * | 2/1975 | Holbrook | ............... | A61M 1/005 137/205 |
| 4,045,004 A * | 8/1977 | Berger | .................. | B01F 5/0212 366/137 |
| 4,195,672 A * | 4/1980 | Freeman | ............. | A01M 7/0092 141/231 |
| 4,263,144 A | 4/1981 | Platt | | |
| 4,388,922 A * | 6/1983 | Telang | .................. | A61M 1/005 141/35 |
| 5,213,683 A * | 5/1993 | Mann | .................... | B01D 15/206 210/189 |
| 5,423,982 A * | 6/1995 | Jungbauer | ............... | B01D 15/14 210/198.2 |
| 5,875,925 A * | 3/1999 | Stevens | ................ | B67D 7/0277 222/158 |
| 5,876,511 A * | 3/1999 | Till | ........................... | B08B 9/08 134/10 |
| 6,065,860 A * | 5/2000 | Fuchsbichler | ........ | B01F 1/0022 366/136 |
| 6,446,679 B2 * | 9/2002 | Hofmann | ............... | G01N 30/56 141/1 |
| 6,463,952 B1 * | 10/2002 | Stevens | .................. | B65D 25/42 137/205 |
| 2002/0153221 A1 * | 10/2002 | Schnepf | .................. | F16D 13/62 192/70.17 |
| 2003/0183299 A1 | 10/2003 | Talamona | | |
| 2005/0242018 A1 * | 11/2005 | Hodgin | .............. | G01N 30/6052 210/198.2 |
| 2009/0007643 A1 * | 1/2009 | Svewnsson | ........... | G01F 23/296 73/61.53 |
| 2010/0046322 A1 * | 2/2010 | Nordberg | ................ | G01N 30/56 366/178.3 |
| 2011/0053127 A1 * | 3/2011 | Karlberg | ............... | B01D 15/206 434/219 |
| 2011/0100932 A1 * | 5/2011 | Lonnqvist | ........... | B01F 13/0211 210/803 |
| 2011/0126936 A1 * | 6/2011 | Dawson | ................ | B65B 31/024 141/10 |
| 2012/0168025 A1 * | 7/2012 | Cerveny | ............... | B65B 43/123 141/10 |
| 2013/0062267 A1 * | 3/2013 | Gebauer | ................ | B01D 15/14 210/198.2 |
| 2013/0186834 A1 * | 7/2013 | Vicalvi | ............... | B01F 7/00141 210/656 |
| 2013/0228501 A1 * | 9/2013 | Lefebvre | ................ | F16L 33/00 210/198.2 |
| 2016/0228790 A1 | 8/2016 | Bjorling et al. | | |
| 2016/0324995 A1 * | 11/2016 | Delaunay | ............ | A61L 2/0023 |
| 2019/0151569 A1 * | 5/2019 | Fangrow | ........... | A61M 5/14546 |

FOREIGN PATENT DOCUMENTS

| | | | |
|---|---|---|---|
| EP | 1566631 A1 | | 8/2005 |
| JP | 2000205900 A | * | 7/2000 |
| JP | 2004004093 A | | 1/2004 |
| JP | 2012159462 A | | 8/2012 |
| WO | 2009093953 A1 | | 7/2009 |
| WO | 2009145714 A1 | | 12/2009 |
| WO | 2011076386 A1 | | 6/2011 |
| WO | 2015047172 A1 | | 4/2015 |

OTHER PUBLICATIONS

Great Britain Search Report corresponding to Great Britain Application No. 1701576.9, dated Aug. 29, 2017.
International Search Report and Written Opinion corresponding to International Application No. PCT/EP2017/074902, dated Dec. 15, 2017.

* cited by examiner

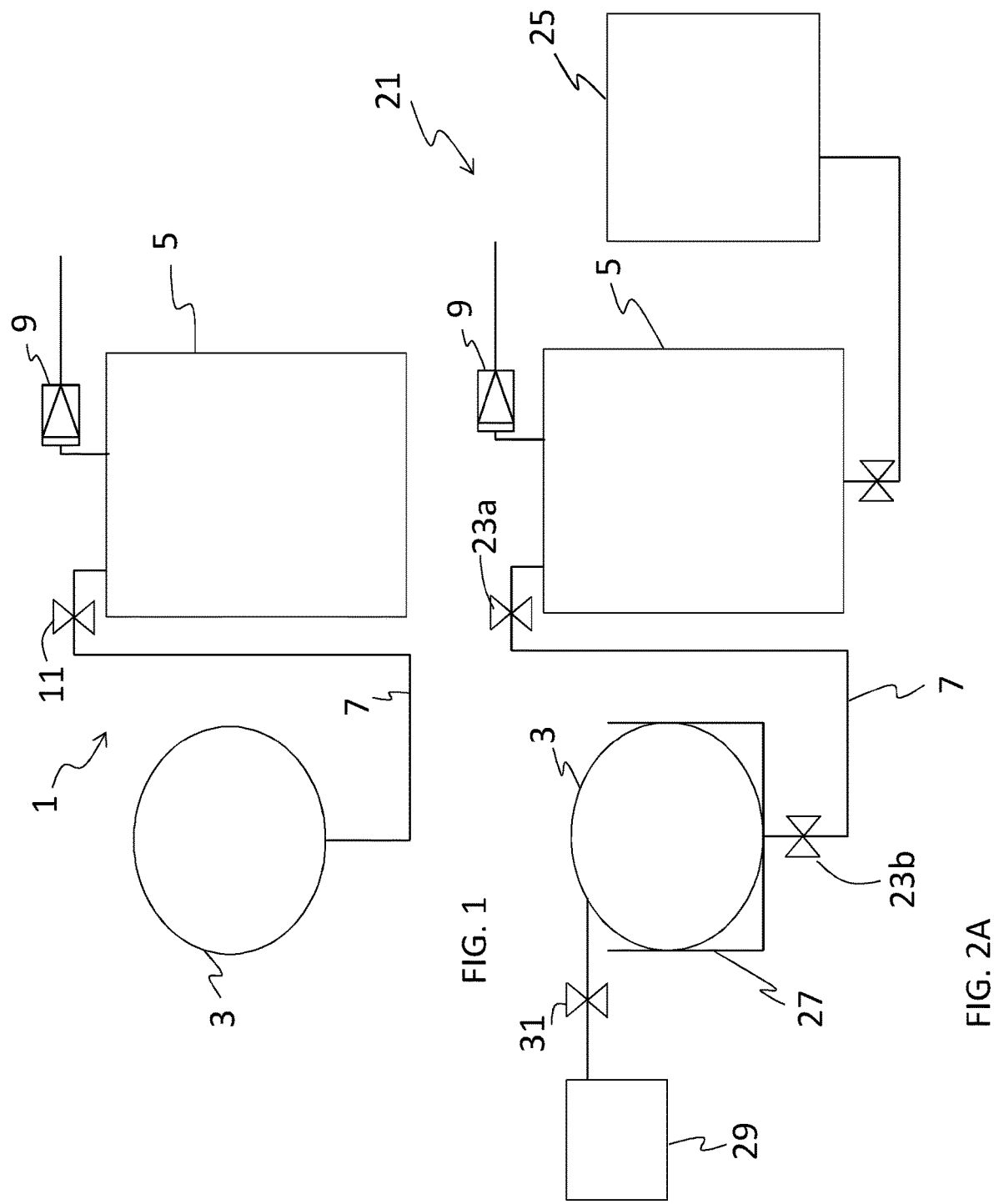

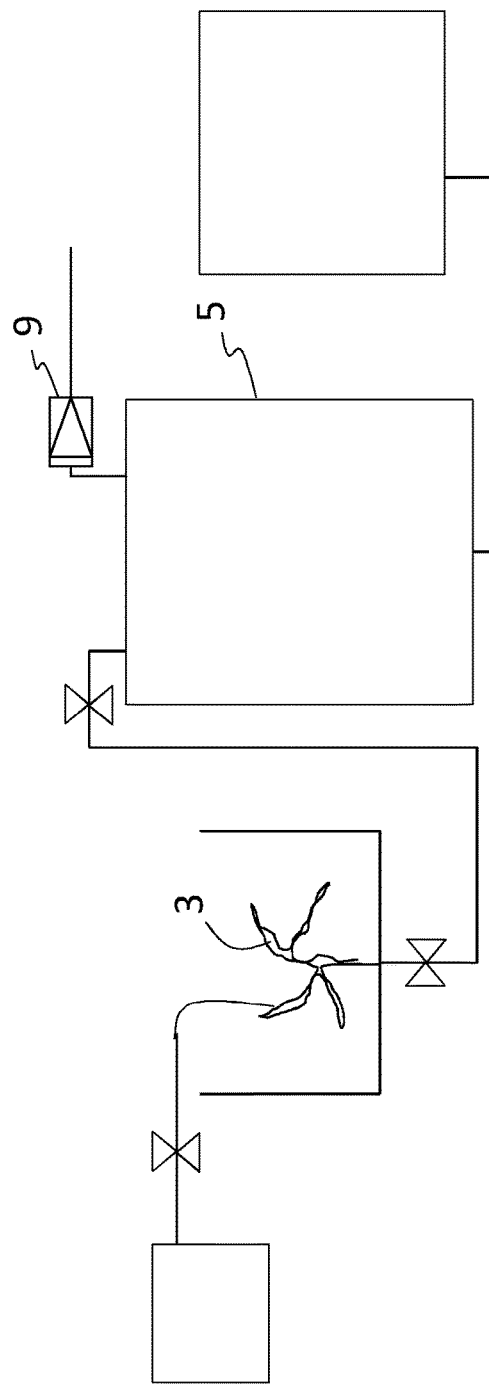

METHOD AND SYSTEM FOR TRANSFERRING SEPARATION RESIN

CROSS-REFERENCE TO RELATED APPLICATIONS

This application is a filing under 35 U.S.C. § 371 and claims priority to international patent application number PCT/EP2017/074902, filed Sep. 29, 2017, published Apr. 5, 2018 as WO2018/060496A1, which claims priority to patent application number 1616702.5 filed in Great Britain on Sep. 30, 2016, and claims priority to patent application number 1701576.9 filed in Great Britain on Jan. 31, 2017.

TECHNICAL FIELD OF THE INVENTION

The present invention relates to a method and a system for transferring a slurry of a separation resin or the like, from at least one first container to a second container.

BACKGROUND OF THE INVENTION

Separation media, also called separation resin, could be for example chromatography media/resin and density gradient media. The media could be for example resins based on natural or synthetic polymer particles or inorganic material. For performing chromatography the separation resin needs to be provided into a chromatography column. For the transportation of the separation resin into for example a column the resin needs first to be suspended into a homogenous resin slurry mixture. The separation resin is normally suspended with a liquid, for example water, buffer or a solvent. This suspended resin is usually called resin slurry, media slurry, slurry or slurry of chromatography media/resin. When a chromatography column should be filled with resin slurry from one or more resin slurry storage containers, an intermediate slurry tank is often used where the slurry is mixed into a homogenous mixture.

The transferring of resin slurry from storage containers to a slurry tank can be handled in different ways. Sometimes the slurry is poured into the slurry tank from the storage containers. However, the containers can be heavy and there may be a risk of spill and waste and biological contamination by operators. Chromatography media is very expensive so waste and contamination need to be avoided. Another method for transferring resin slurry from a storage container to a slurry tank is to use some kind of transfer device, e.g. a membrane pump.

The handling and transferring of the slurry is often at least in some steps an open process, i.e. the slurry is exposed to ambient air and transferring means. This can introduce impurities and particles and biological vegetative contamination into the slurry resin.

In the slurry tank the slurry is mixed into a homogenous mixture which then is transferred to the chromatography column. The whole amount of slurry needs to be transferred without interruption in order to avoid that the slurry starts to settle in the chromatography column before the packing procedure begins. When the slurry has been transferred to the column the packing process needs to get started as soon as possible while the slurry still is in suspended, homogenous form in order to achieve a uniformly packed bed.

SUMMARY

An object of the present invention is to provide an improved method and system for transferring slurry of separation resin between containers.

This is achieved by a method and a system according to the independent claims.

A method is provided for transferring a slurry of a separation resin, from at least one first container to a second container, said method comprising the steps of:
connecting the at least one first container to the second container by a transferring connection;
providing a degree of vacuum to the second container by a vacuum production device connected to the second container;
allowing the vacuum in the second container to affect the content in the at least one first container through the transferring connection such that the slurry initially provided in the at least one first container is transferred to the second container through the transferring connection.

And a system is provided for transferring a slurry of a separation resin between at least two containers, said system comprising:
at least one first container which initially comprises a slurry of a separation resin;
a second container;
at least one vacuum production device connected to the second container and arranged for providing a vacuum in the second container at least during a transferring of the slurry from the at least one first container to the second container; and
a transferring connection connecting the at least one first container and the second container such that the slurry initially provided in the at least one first container can be transferred from the at least one first container to the second container through the transferring connection by the vacuum provided to the second container.

Hereby a method and a system for the transferring of a slurry of separation resin from at least one first container to a second container is achieved where the transferring of slurry can be performed in a clean, closed system without exposing the media slurry to ambient air or a pump unit. The connections can be provided as disposable and pre-sterilized. Hereby a closed, safe transfer of resin slurry between a disposable slurry storage container and a slurry tank or directly to a chromatography column can be provided.

In one embodiment of the invention the step of connecting the at least one first container to the second container comprises connecting the two containers by disposable, pre-sterilized connecting parts. i.e. the transferring connection comprises disposable connecting parts, such as pre-sterilized tubing and aseptic connectors. Hereby a closed aseptic transferring of the slurry can be provided and the risk for contamination is decreased.

In one embodiment of the invention the step of allowing the vacuum in the second container to affect the content in the at least one first container comprises opening a valve provided in the transferring connection between the at least one first container and the second container, i.e. the transferring connection comprises at least one valve whereby opening of the valve allows vacuum provided to the second container to affect the content in the first container such that the slurry initially provided in the first container is transferred to the second container through the transferring connection. Hereby opening and closing of the valve controls the transferring of slurry from the first container to the second container.

In one embodiment of the invention the method further comprises the step of rinsing the at least one first container by transferring a rinsing solution through the at least one first container and further to the second container, said rinsing solution coming from a rinse bag connected to the at least one first container, said transferring of a rinsing solution being accomplished by the same vacuum as provided to the second container for transferring the slurry. Hereby it can be assured that all slurry initially provided in the first container is transferred to the second container. Waste of slurry is avoided.

In one embodiment of the invention the step of rinsing the at least one first container comprises opening a rinsing valve provided in the connection between the at least one first container and the rinse bag to allow the vacuum provided to the second container to transfer rinsing solution from the rinse bag through the at least one first container and finally to the second container and closing the rinse valve when a suitable amount of rinsing solution has been transferred.

In one embodiment of the invention the method comprises connecting two or more first containers in series or in parallel to the second container allowing the content of all of the first containers to be transferred to the second container through one and the same transferring connection. Hereby only one transferring connection needs to be provided for transferring slurry from more than one first containers. Hereby risk of contamination is decreased and the handling is facilitated.

In one embodiment of the invention the first container is a disposable, flexible slurry storage bag and the second container is a slurry tank or a chromatography column.

In one embodiment of the invention the transferring connection comprises a disposable hollow rod with a first end of the hollow rod arranged for pointing down into the first container and a second end of the hollow rod arranged to be connected by disposable connecting parts to the second container.

In one embodiment of the invention the method further comprises the step of mixing the slurry in the second container by using a connected liquid supply system for fluidizing the slurry inside the second container. In one embodiment of the invention the second container is a chromatography column connected to a liquid supply system. Hereby a homogenized slurry can be achieved within the second container and a chromatography bed can be packed within the second container. Hereby an intermediate slurry tank can be avoided and the handling of slurry is simplified. Furthermore risk of contamination is decreased.

In one embodiment of the invention the step of providing a degree of vacuum to the second container by a vacuum production device connected to the second container comprises controlling an adaptor provided in the second container.

In one embodiment of the invention the second container comprises a liquid distribution system at an inlet for the liquid supply system hereby improving a homogenization of the slurry provided by the fluidization.

In one embodiment of the invention the second container comprises an adaptor defining the internal volume of the second container together with a bottom and internal walls of the second container, which adaptor can be used as the vacuum production device by raising it within the second container thus increasing the internal volume of the second container.

BRIEF DESCRIPTION OF THE DRAWINGS

FIG. 1 is a schematic drawing of a system according to one embodiment of the invention.

FIG. 2a is a schematic drawing of a system according to one embodiment of the invention in an initial phase of the process.

FIG. 2b is a schematic drawing of the same system as shown in FIG. 2a but in a later phase of the process.

FIG. 3 is a schematic drawing of a system according to one embodiment of the invention.

DETAILED DESCRIPTION OF THE INVENTION

Figure 4:
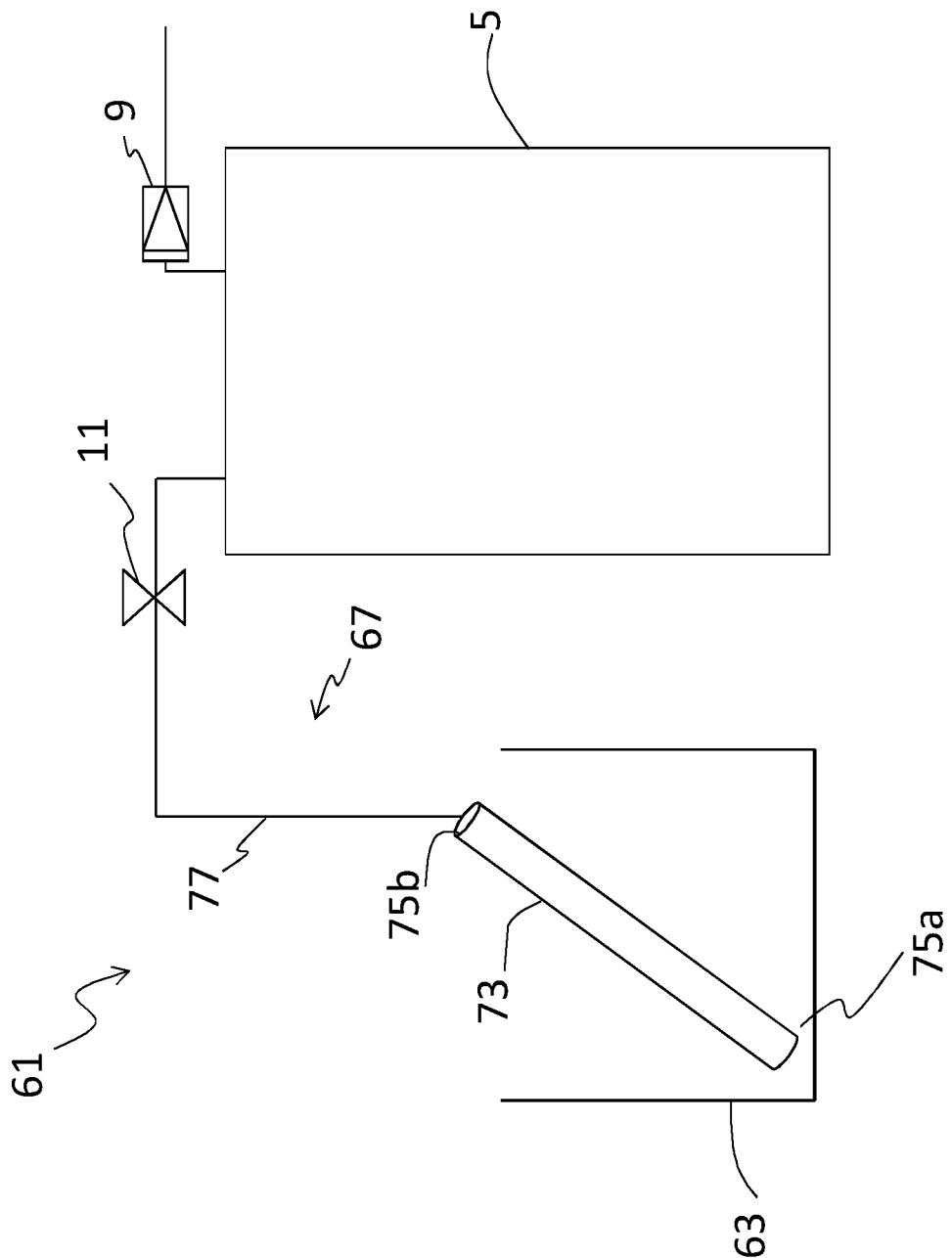
FIG. 4 is a schematic drawing of a system according to one embodiment of the invention.

FIG. 1 is a schematic drawing of a system 1 according to one embodiment of the invention. The system is a system for transferring a slurry of a separation resin, hereafter called a resin slurry or only a slurry, between at least two containers. The separation resin can be a chromatography resin, often also called chromatography media.

A first container 3 and a second container 5 are shown in this embodiment. A transferring connection 7 is provided between the first and the second containers 3, 5. The first container 3 is a storage container for a separation resin, such as a slurry of chromatography resin. In this embodiment the first container 3 is a flexible disposable bag. The first container 3 can in this embodiment be made of for example a flexible plastic material. According to the invention the system 1 further comprises at least one vacuum production device 9 connected to the second container 5. Said vacuum production device 9 is arranged for providing a degree of vacuum in the second container 5 at least during a transferring of the slurry resin from the first container 3 to the second container 5. The vacuum production device 9 can be for example a vacuum pump or an ejector. The transferring connection 7 between the first container 3 and the second container 5 comprises according to one embodiment of the invention disposable connecting parts, such as pre-sterilized tubing and aseptic connectors. In another embodiment of the invention the transferring connection 7 comprises other tubing and connectors, not necessarily pre-sterilized. The slurry resin initially provided in the first container 3 can be transferred from the first container 3 to the second container 5 through the transferring connection 7 by the vacuum provided to the second container 5 by the vacuum production device 9.

The second container 5 is in one embodiment of the invention a slurry tank. A slurry tank is used as an intermediate step between a slurry storage container and a chromatography column. In the slurry tank the slurry can often be stirred into a homogenous slurry and it can be diluted to a wanted concentration. In another embodiment of the invention the second container 5 is the chromatography column itself. This will be further described in relation to FIG. 6 below. In some cases where the chromatography column comprises a vacuum production device and no intermediate stirring and dilution is needed slurry could be transferred directly from a first container 3 into a chromatography column. Homogenization of the slurry could be performed inside the chromatography column itself which will be further described below.

Suitably the transferring connection 7 between the first container 3 and the second container 5 comprises at least one valve 11. Opening of the valve 11 will allow vacuum provided in the second container 5 to affect also the content in the first container 3 such that the slurry which initially is provided in the first container 3 is transferred to the second container 5 through the transferring connection 7. Hereby a closed transferring of the slurry from the first container to the second container can be performed. The slurry will only pass through the transferring connection 7.

FIG. 2a is a schematic drawing of a system 21 according to one embodiment of the invention in an initial phase of the process and FIG. 2b is a schematic drawing of the same system 21 as shown in FIG. 2a but in a later phase of the process. The first and second containers 3, 5, the transferring connection 7 between them and the vacuum production device 9 are given the same reference numbers as in the embodiment shown in FIG. 1 and the function of these parts are the same as described in relation to FIG. 1. The transferring connection 7 is in this embodiment shown to comprise a first valve 23a and a second valve 23b. The second valve 23b is provided close to the outlet of the first container 3 and can be suitable for inhibiting a resin plug which could hinder suction through the transferring connection to the second container 5. In this embodiment it is further shown how the second container 5 is connected to a chromatography column 25. In this embodiment the second container 5 is hereby not a chromatography column but rather a slurry tank. Furthermore, in this embodiment it is shown that the first container 3 is provided inside a rigid bin 27. If the first container 3 is a flexible bag such a rigid bin 27 is suitable for holding the first container 3 during transferring of the slurry to the second container 5.

Furthermore, in the embodiment shown in FIG. 2A and 2B the system 21 further comprises a rinse bag 29 which is connected to the first container 3. Said rinse bag 29 comprises a rinsing solution, for example a buffer for rinsing the first container 3 when the slurry has been transferred to the second container 5. Said rinsing solution is transferred from the rinse bag 29 to the first container 3 by the same vacuum as provided to the second container 5 for transferring the slurry. A rinse valve 31 is provided in the connection between the rinse bag 29 and the at least one first container 3 such that rinsing solution is transferred form the rinse bag 29 to the first container 3 by the vacuum provided to the second container 5 by the vacuum production device 9 only when the valve 31 is open. Of course also the valves 23a, 23b in the transferring connection 7 between the first container 3 and the second container 5 need to be open during the rinsing. Normally only a small amount of rinsing solution is needed for rinsing the first container 3. An operator can open and close the rinse valve 31 manually and the operator can normally see how much rinsing solution is needed for the rinsing and thus how long time the rinse valve needs to be open. However an automated control of the opening and closing of the rinse valve 31 can also be provided.

In FIG. 2B the system 21 of FIG. 2A is shown in a later stage of the process when the first container 3 has been emptied. Because the first container 3 in this embodiment is a flexible bag the bag will be emptied and compacted by the vacuum, shown in FIG. 2B.

FIG. 3 is a schematic drawing of a system 41 according to one embodiment of the invention. The rinse bag 29, the rinse valve 31 and the second container 5 corresponds to the same components as described in relation to the embodiment of FIG. 2A and B (however in this embodiment the second container 5 can be a slurry tank or a chromatography column as in FIG. 1) and keep the same reference numbers. In this embodiment however there are more than one first container 3a, 3b provided. Here two first containers 3a, 3b are shown connected in series. They could as well be connected in parallel. A transferring connection 7 is provided between the second container 5 and the set of first containers 3a, 3b. If the first containers as in this example are connected in series the connection 7 is provided from the last one of the first containers 3b in the series. A reason for connecting more than one first containers 3 at the same time for transferring of slurry to the second container 5 is that often these storage containers for slurry (first container) are small compared to a slurry tank or chromatography column (second container). By connecting the first containers to each other (in series or in parallel) all of them can be emptied into the second container at the same time using one and the same transferring connection 7. If instead the transferring connection 7 needs to be set up for each first container 3 to be emptied into the second container 5 there may be an increased risk for contamination.

With this invention a closed slurry transferring system has been provided. Because disposable parts and aseptic connections can be used and because the slurry is not subjected to ambient air during the transferring cleaning validation of the transfer system can be avoided. Furthermore, the slurry will not be in contact with a pumping device (which would be the case in some prior art). This will provide the possibility to use only disposable clean parts for the transferring.

FIG. 4 is a schematic drawing of a system 61 according to one embodiment of the invention. In this system 61 a transferring connection 67 between a first container 63 and a second container 5 comprises a disposable hollow rod 73 with a first end 75a of the hollow rod 73 arranged for pointing down into the first container 63 and a second end 75b of the hollow rod 73 arranged to be connected by tubing 77 and connectors, possibly disposable, pre-sterilized tubing and aseptic connectors, to the second container 5. In this embodiment the first container 63 need not be a flexible bag but can as well be a rigid storage container for slurry. The principle is however the same: a vacuum production device 9 connected to the second container 5 produces a degree of vacuum in the second container 5, which vacuum is used to transfer slurry form the first container 63 to the second container 5. A valve 11 in the transferring connection 67 between the first container 63 and the second container 5 needs to be opened when the slurry is transferred.

Figure 5:
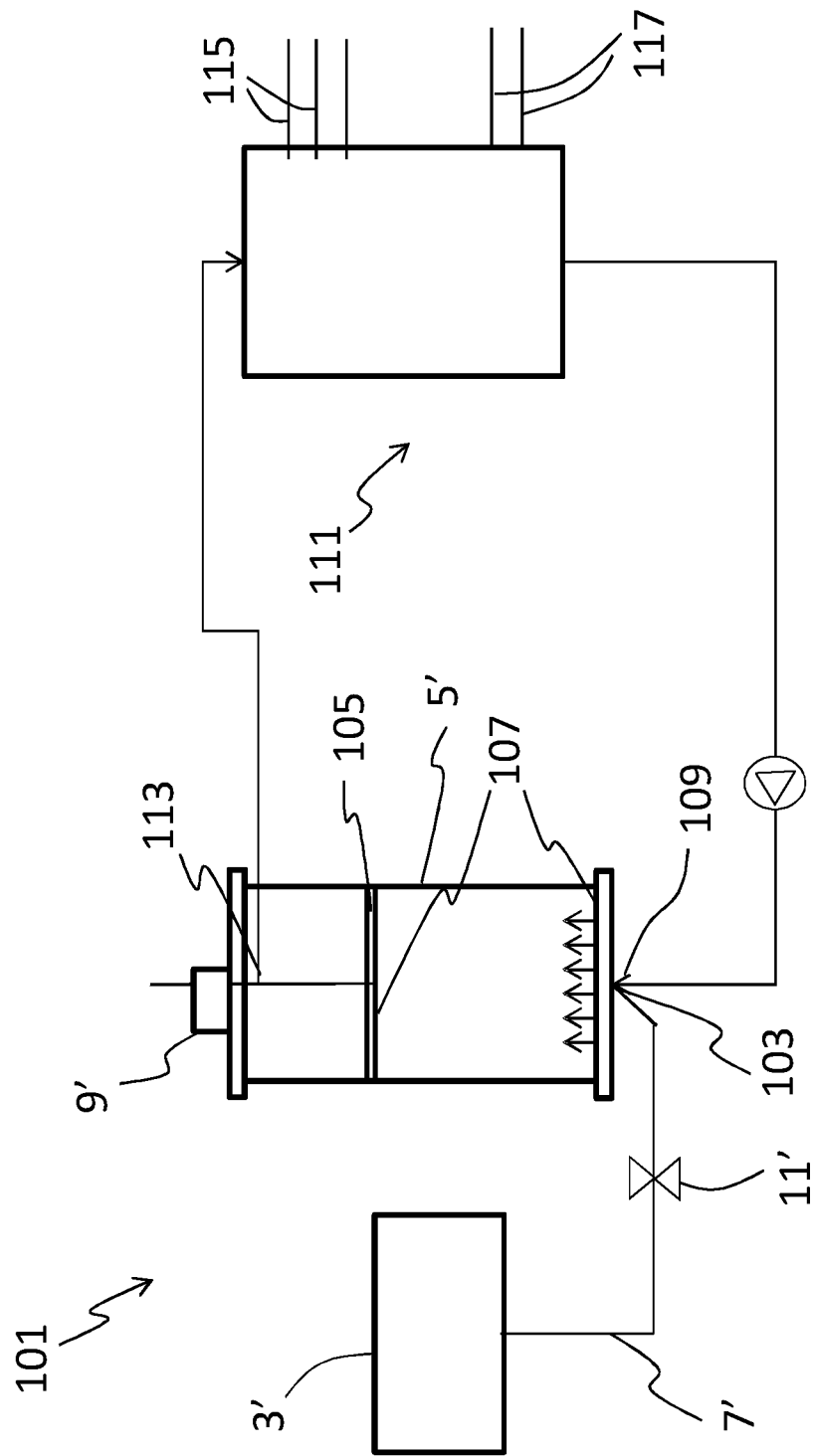
FIG. 5 is a schematic drawing of a system according to one embodiment of the invention.

FIG. 5 is a schematic drawing of a system 101 according to one embodiment of the invention. This is the same system as described in FIG. 1 but including more details of the second container 5'. In this embodiment of the invention the second container 5' is a chromatography column. A first container 3' is connected to a slurry inlet 103 of the second container 5'. The slurry inlet 103 is here shown provided in a bottom part of the second container 5'. In this embodiment of the invention the second container 5' comprises also an adaptor 105 commonly used for packing a chromatography bed by compressing the slurry. The adaptor 105 can be controlled to move up and down inside the chromatography column (second container) 5' and defines together with the inner walls of the second container 5' the internal volume of the chromatography column 5'. A vacuum production device 9' is provided to the second container 5'. This could either be the control of the adaptor position. When lifting the adaptor in the closed internal volume of the second container 5' a vacuum will be provided inside the second container 5'. Alternatively the vacuum production device 9' could be a vacuum pump or ejector as described above. The second container 5' comprises in this embodiment two liquid distribution plates and filters 107. The liquid distribution plates are provided for distributing sample and buffer over the whole cross section area of the second container and the filters are provided for keeping the chromatography media inside the column. One liquid distribution plate and filter is provided at a bottom of the column and one is provided to the adaptor 105. The inlet 103 for the slurry allows the slurry to pass the liquid distribution plate and the filter 107. A separate sample and buffer inlet 109 is also provided to a bottom part of the second container 5'. The sample and buffer inlet 109 is connected to a liquid supply system 111. The liquid supply system 111 is further connected to an outlet 113 from the second container 5' provided through the adaptor 105. The liquid supply system comprises inlets 115 and outlets 117 for further connection to different samples and buffers to be provided to the second container 5' and to different collection devices for collecting sample outlet form the chromatography system.

Slurry can be provided from the first container 3' to the second container 5' by use of vacuum in the same way as described above in relation to the previously described embodiments, for example by opening the valve 11' and lifting the adaptor 105 by the vacuum production device 9'. If further homogenization of the slurry is needed before a packing procedure starts buffer, solution or water can be fluidized through the second container 5' and thus through the slurry by the use of the liquid supply system 111 and sample and buffer inlet 109 and outlet 113. This will cause the slurry to be mixed and homogenized.

One or more slurry bags (first containers 3'), which possibly are prefilled, flexible and pre-sterilized, can be connected by pre-sterilized, disposable tubing to the chromatography column (second container 5'). The slurry can be provided to the chromatography column without any risk for contamination and if needed further slurry homogenization can be provided inside the column itself. Because of the homogenization step inside the second container 5' it is not crucial to fill the slurry in one continuous process. Furthermore a rinse bag 29 as described in relation to the previous embodiments can be provided also to this embodiment. This is also shown in the embodiment described below in relation to FIG. 6.

Figure 6:
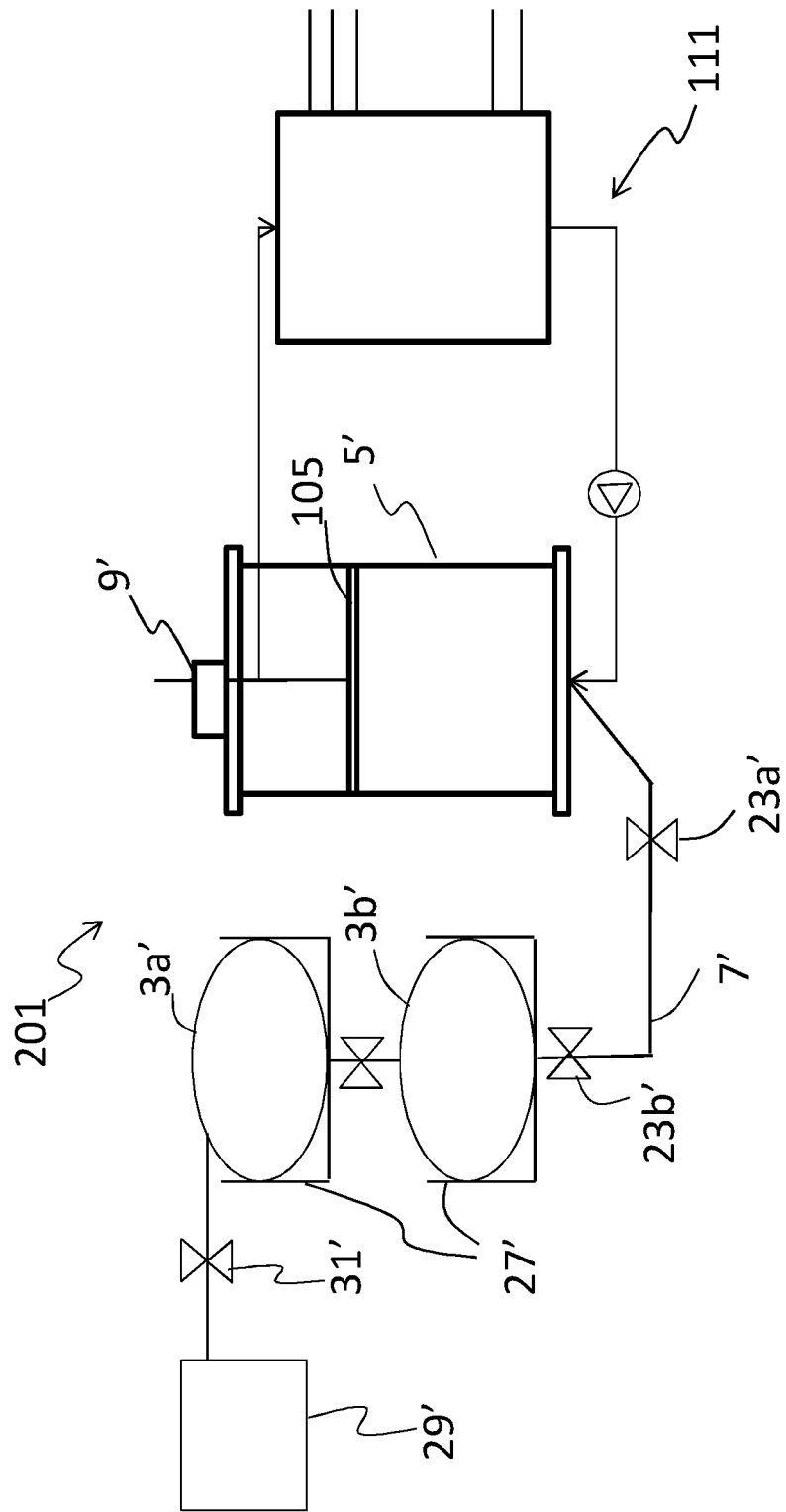
FIG. 6 is a schematic drawing of a system according to one embodiment of the invention.

FIG. 6 is a schematic drawing of a system 201 according to one embodiment of the invention. The second container 5' is also in this embodiment a chromatography column as described above in relation to FIG. 5. Here two first containers 3a', 3b' are provided connected in series in the same way as described in relation to FIG. 3. They could also be connected in parallel or be more than two. The transferring connection 7' is in this embodiment shown to comprise a first valve 23a' and a second valve 23b' just as described in relation to FIGS. 2 and 3. Furthermore, in this embodiment it is shown that the first containers 3a', 3b' are provided inside rigid bins 27'. If the first containers 3a', 3b' are flexible bags such a rigid bin 27' is suitable for holding the first containers 3a', 3b' during transferring of the slurry to the second container 5'.

The system 201 further comprises a rinse bag 29' which is connected to the first containers 3a', 3b'. Said rinse bag 29' comprises a rinsing solution, for example a buffer for rinsing the first containers 3a', 3b' when the slurry has been transferred to the second container 5'. Said rinsing solution is transferred from the rinse bag 29' to the first containers 3a', 3b' by the same vacuum as provided to the second container 5' for transferring the slurry. A rinse valve 31' is provided in the connection between the rinse bag 29' and the at least one first containers 3a', 3b' such that rinsing solution is transferred form the rinse bag 29' to the first containers 3a', 3b' by the vacuum provided to the second container 5' by the vacuum production device 9' only when the valve 31' is open. Of course also the valves 23a', 23b' in the transferring connection 7' between the first containers 3a', 3b' and the second container 5' need to be open during the rinsing. Normally only a small amount of rinsing solution is needed for rinsing the first containers 3a', 3b'. In one embodiment of the invention an air sensor can be provided to the inlet to the second container. When the second container is a chromatography column air should suitably be avoided to be transferred into the chromatography column. A liquid supply system 111 is connected to the second container 5' in the same way as described above in relation to FIG. 5. Hereby the slurry can be homogenized by flowing a buffer, solution or water through the slurry inside the second container 5' before the slurry later is packed. Furthermore the second container 5' can comprise adaptor 105 and filter and distribution system 107 as described above in relation to FIG. 5.

Figure 7:
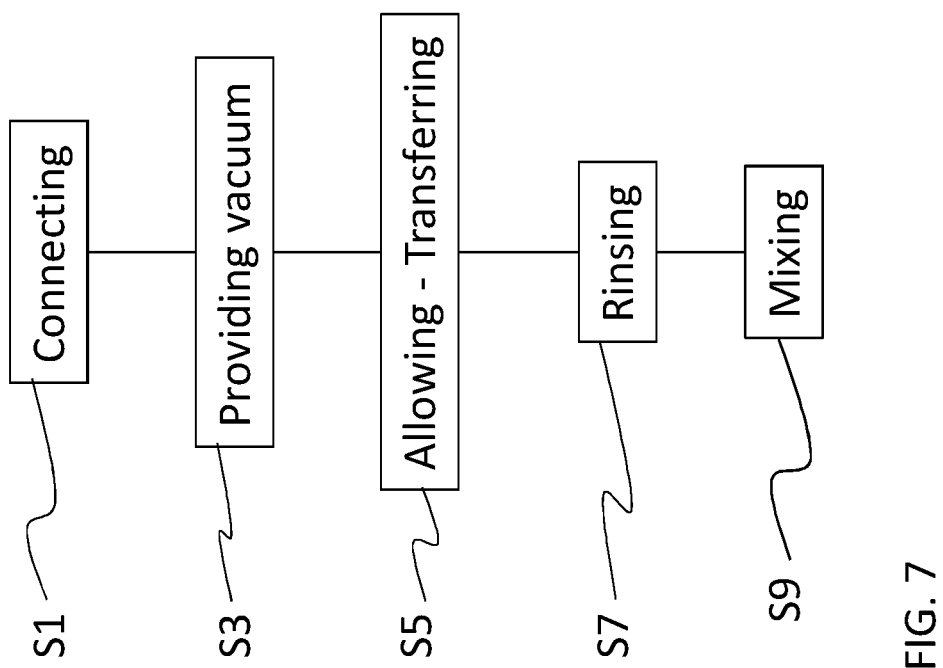
FIG. 7 is a flow chart of a method according to one embodiment of the invention.

FIG. 7 is a flow chart of a method for transferring a slurry of a separation resin from at least one first container 3; 3'; 3a, 3b; 3a', 3b'; 63 to a second container 5, 5' according to one embodiment of the invention. The method steps are described in order below:

S1: Connecting the at least one first container 3; 3'; 3a, 3b; 3a', 3b'; 63 to the second container 5; 5' by a transferring connection 7; 7'. The transferring connection 7; 7' comprises in one embodiment disposable connecting parts, which could be pre-sterilized tubing and aseptic connectors. In another embodiment the transferring connection 7; 7' comprises other, non-sterile tubing and connectors.

S3: Providing a degree of vacuum to the second container 5; 5' by a vacuum production device 9; 9', such as a vacuum pump or ejector, which is connected to the second container 5; 5'.

S5: Allowing the vacuum in the second container 5; 5' to affect the content in the at least one first container 3; 3'; 3a, 3b; 3a', 3b'; 63 through the transferring connection 7; 7' such that the slurry initially provided in the at least one first container 3; 3'; 3a, 3b; 3a', 3b'; 63 is transferred to the second container 5; 5' through the transferring connection 7; 7' without the slurry being in contact with the vacuum production device 9; 9' during the transfer.

In one embodiment of the invention the step of allowing the vacuum provided in the second container 5; 5' to affect the content in the at least one first container 3; 3'; 3a, 3b; 3a', 3b'; 63 comprises opening a valve 11; 11' provided in the transferring connection 7; 7' between the at least one first container 3; 3'; 3a, 3b; 3a', 3b'; 63 and the second container 5; 5'.

In one embodiment of the invention the method further comprises the optional step of:

S7: Rinsing the at least one first container 3; 3'; 3a, 3b; 3a', 3b'; 63 in order to assure that substantially all slurry will be transferred to the second container 5; 5'. The rinsing being accomplished by transferring a rinsing solution, which could be for example a buffer, through the at least one first container 3; 3'; 3a, 3b; 3a', 3b'; 63 and further to the second container 5; 5'. Said rinsing solution coming from a rinse bag 29; 29' connected to the at least one first container 3; 3'; 3a, 3b; 3a', 3b'; 63 and said transferring of a rinsing solution being accomplished by the same vacuum as provided to the second container 5; 5' for transferring the slurry.

Suitably the step of rinsing the at least one first container 3; 3'; 3a, 3b; 3a', 3b'; 63 comprises opening a rinsing valve 31; 31' provided in the connection between the at least one first container 3; 3'; 3a, 3b; 3a', 3b'; 63 and the rinse bag 29; 29' to allow the vacuum provided to the second container 5; 5' to transfer rinsing solution from the rinse bag 29; 29' through the at least one first container 3; 3'; 3a, 3b; 3a', 3b'; 63 and finally to the second container 5; 5' and closing the rinse valve when a suitable amount of rinsing solution has been transferred.

In one embodiment of the invention the method comprises connecting two or more first containers 3a, 3b; 3a', 3b' in series or in parallel to the second container 5; 5' allowing the content of all of the first containers 3a, 3b; 3a', 3b' to be transferred to the second container 5; 5'.

In one embodiment of the invention the method further comprises the optional step of:

S9: Mixing the slurry in the second container 5; 5'. By mixing the slurry the slurry will be homogenized and can be packed into a chromatography bed. Herby the use of an intermediate slurry tank can be avoided. The mixing of the slurry in the second container 5; 5' can be performed by fluidizing the slurry, for example from below as shown in FIGS. 5 and 6. A connected liquid supply system could provide buffer or water to the second container 5, 5' and hereby the slurry can be mixed and homogenized.

Whilst different embodiments have been described above, and illustrated, it will be apparent to the skilled person that additions, modifications, or deletions could be applied to those embodiments without departing from the invention as claimed. In particular, the invention is aimed at manipulation of a slurry of separation resin used for example to fill chromatography columns, but the invention is applicable to other viscous or semi viscous fluid materials which may or may not be described as resins or the like.

The invention claimed is:

1. A method for transferring a slurry of a separation resin, from at least one first container to a second container, said method comprising the steps of:
   connecting the at least one first container to the second container by a transferring connection, wherein the first container is a disposable, flexible slurry storage bag and the second container is a slurry tank or a chromatography column;
   providing a degree of vacuum to the second container by a vacuum production device connected to the second container, comprising controlling an adaptor provided in the second container;
   allowing the vacuum in the second container to affect the content in the at least one first container through the transferring connection such that the slurry of the separation resin initially provided in the at least one first container is transferred to the second container through the transferring connection.

2. A method according to claim 1, wherein the step of connecting the at least one first container to the second container comprises connecting the two containers by disposable, pre-sterilized connecting parts, comprising providing a disposable hollow rod with a first end of the hollow rod pointing down into the first container and connecting a second end of the hollow rod by disposable connecting parts to the second container.

3. A method according to claim 1, wherein the step of allowing the vacuum in the second container to affect the content in the at least one first container comprises opening at least one valve provided in the transferring connection between the at least one first container and the second container.

4. A method according to claim 1, further comprising the step of:
   rinsing the at least one first container by transferring a rinsing solution through the at least one first container and further to the second container, said rinsing solution coming from a rinse bag connected to the at least one first container, said transferring of a rinsing solution being accomplished by the same vacuum as provided to the second container for transferring the slurry.

5. A method according to claim 4, wherein the step of rinsing the at least one first container comprises opening a rinsing valve provided in the connection between the at least one first container and the rinse bag to allow the vacuum provided to the second container to transfer rinsing solution from the rinse bag through the at least one first container and finally to the second container and closing the rinse valve when a suitable amount of rinsing solution has been transferred.

6. A method according to claim 1, further comprising:
   connecting two or more first containers in series or in parallel to the second container allowing transfer of a content of all of the first containers to the second container through one and the same transferring connection.

7. A method according to claim 1, further comprising the step of:
   mixing the slurry in the second container by using a connected liquid supply system for fluidizing the slurry inside the second container.

8. A system for transferring a slurry of a separation resin between at least two containers, said system comprising:
   at least one first container which initially comprises a slurry of a separation resin;
   a second container wherein the at least one first container is at least one flexible disposable bag;
   at least one vacuum production device connected to the second container and arranged for providing a degree of vacuum in the second container at least during a transferring of the slurry from the at least one first container to the second container, wherein the second container comprises an adaptor defining the internal volume of the second container together with a bottom and internal walls of the second container, which adaptor can be used as the vacuum production device by raising it within the second container thus increasing the internal volume of the second container; and
   a transferring connection connecting the at least one first container the second container such that the slurry of the separation resin initially provided in the at least one first container can be transferred from the at least one first container to the second container through the transferring connection by the vacuum provided to the second container.

9. A system according to claim 8, wherein the transferring connection comprises disposable pre-sterilized connecting parts, comprising a disposable hollow rod with a first end of the hollow rod arranged for pointing down into the first container and a second end of the hollow rod arranged to be connected by disposable connecting parts to the second container.

10. A system according to claim 8, wherein the transferring connection comprises at least one valve whereby opening of the at least one valve allows vacuum provided to the second container to affect the content in the first container such that the slurry initially provided in the first container is transferred to the second container through the transferring connection.

11. A system according to claim 8, wherein the system further comprises a rinse bag connected to the first container, said rinse bag comprising a rinsing solution for rinsing the first container when the slurry has been transferred to the second container, said rinsing solution being transferred from the rinse bag to the first container by the same vacuum as provided to the second container for transferring the slurry.

12. A system according to claim 11, wherein a rinse valve is provided between the rinse bag and the at least one first container such that rinsing solution is transferred from the rinse bag to the at least one first container by the vacuum provided to the second container when the rinse valve is open.

13. A system according to claim 8, wherein at least two first containers are provided in the system connected in series or in parallel and connected to the second container.

14. A system according to claim 8, wherein the second container is a chromatography column connected to a liquid supply system such that the slurry can be fluidized within the second container by the liquid supply system.

15. A system according to claim 14, wherein the second container comprises a liquid distribution system at an inlet for the liquid supply system hereby improving a homogenization of the slurry provided by the fluidization.

* * * * *